L. TOPF.
APPARATUS FOR PRODUCING AND CONTROLLING MOISTENED AIR IN MALTING DRUMS.
APPLICATION FILED JAN. 12, 1912.
1,104,717.                                    Patented July 21, 1914.
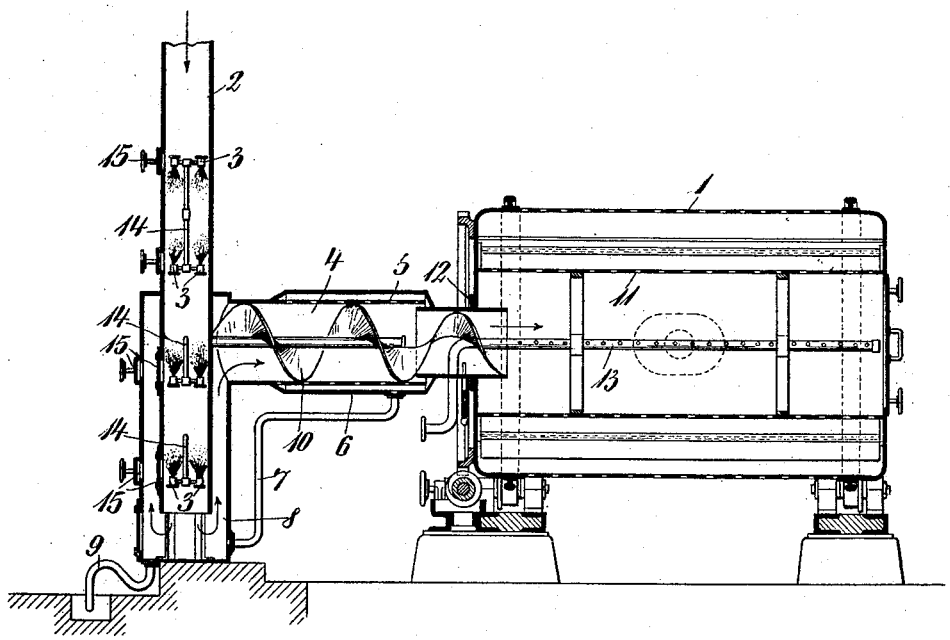

UNITED STATES PATENT OFFICE.

LUDWIG TOPF, OF ERFURT, GERMANY.

APPARATUS FOR PRODUCING AND CONTROLLING MOISTENED AIR IN MALTING-DRUMS.

1,104,717. Specification of Letters Patent. Patented July 21, 1914.

Application filed January 12, 1912. Serial No. 670,895.

*To all whom it may concern:*

Be it known that I, LUDWIG TOPF, a citizen of the German Empire, residing at Erfurt, in the Kingdom of Prussia, Empire of Germany, have invented certain new and useful Improvements in Apparatus for Producing and Controlling Moistened Air in Malting-Drums; and I do hereby declare the following to be a full, clear, and exact description of the invention, such as will enable others skilled in the art to which it appertains to make and use the same.

The present invention relates to an improved apparatus for imparting a proper degree of moisture to the air used in malting drums, and with this object in view the invention consists in a particular arrangement of moistening apparatus positioned in close proximity to separating and distributing elements.

The invention is illustrated in the accompanying drawing, in one form of construction by way of example, a vertical longitudinal section through the complete apparatus being shown.

A drum 1, which is fed with air through an air-cooler 2, serves for receiving the material to be treated, the air being preferably moistened in this air-cooler by means of an air-moistening apparatus 3 which may be shut off or thrown out of action, the air before entering the drum 1 being passed through a water-separator 4, in which the surplus water carried with the air in the form of drops is eliminated. This water-separator 4 consists of a pipe 5, which is perforated, and surrounded by an enlarged casing 6 to catch the eliminated water, which is then conveyed through a pipe 7 to another casing 8 from whence it runs away through a further pipe 9 together with the water eliminated or precipitated there. A kind of helical surface 10 is provided for eliminating the water, and this surface extends as far as the drum 1 or to the pipe 11 and opposes the air current, so that the water is separated from the latter; and further the air on its escape from the water-separator 4 and on its entrance into the drum 1 is distributed therein. The water-separator 4 is stationary and is packed against the drum 1 by packing strips 12. Finally in order if necessary to be able to introduce water directly into the drum, a pipe 13 may be provided which has suitable apertures inside the drum.

The air-moistening apparatus consists substantially of nozzles 3, to which water is conveyed through pipes 14. Removable covers 15 are also provided to allow access to the nozzles 3, and after the removal of these covers the nozzles 3, for instance, may be adjusted.

The moistening of the air, the elimination of the water, and the distribution of the air take place in the following way:—The nozzles 3 are adjusted according to requirements, and water is then conveyed to them through the pipes 14 and also air from above forced into the air-cooler 2 by means of a fan, piston or the like. When the air has been saturated with moisture, it escapes at the lower end of the air-cooler 2 into a jacket or casing 8, from whence it reaches the water-separator 4. Here the moistened air encounters the helical surface 10, whereupon the surplus water is precipitated and carried off through a pipe 7, while the air is at the same time distributed in consequence of the helical form of the surfaces 10, so that it flows through the whole of the drum 1.

While I have shown the drum as a malting drum, it will be understood that the apparatus could be used in connection with any receptacle in which it is desired to supply cooled and moistened air.

I declare that what I claim is:—

1. An apparatus for supplying a receptacle with air having moisture therein and for regulating said moisture, consisting of a moistening and cooling chamber, a second horizontal chamber in communication with a moistening chamber, a spiral baffle located in the horizontal chamber, said horizontal chamber having perforations in its walls, a casing surrounding the horizontal chamber around the perforated portion, and a pipe leading from the casing to the moistening chamber.

2. An apparatus of the character described, comprising a vertically disposed chamber, an air feeding pipe extending into said chamber and terminating near the lower end thereof, means for feeding air to the upper end of the pipe, a series of nozzles for spraying water in said pipe, a horizontal chamber in communication with the vertically disposed chamber adjacent its upper end, a spiral baffle in said horizontal chamber, a casing surrounding the horizontal chamber, said chamber having perforations to allow the surplus moisture to pass therefrom to the casing.

In testimony whereof I affix my signature, in presence of two witnesses.

LUDWIG TOPF.

Witnesses:
 ALFRED HOFFMANN,
 BERTICE B. BUSSER.

Copies of this patent may be obtained for five cents each, by addressing the "Commissioner of Patents, Washington, D. C."